(12) United States Patent
Snyder

(10) Patent No.: US 11,586,760 B2
(45) Date of Patent: Feb. 21, 2023

(54) SYSTEM AND METHOD FOR ASSOCIATING MULTIPLE LOGINS TO A SINGLE RECORD IN A DATABASE

(71) Applicant: Main Sequence Technology, Inc., Willoughby, OH (US)

(72) Inventor: Michael H. Snyder, Munson, OH (US)

(73) Assignee: MAIN SEQUENCE TECHNOLOGY, INC., Willoughby, OH (US)

( * ) Notice: Subject to any disclaimer, the term of this patent is extended or adjusted under 35 U.S.C. 154(b) by 405 days.

(21) Appl. No.: 16/910,401

(22) Filed: Jun. 24, 2020

(65) Prior Publication Data

US 2020/0401721 A1 Dec. 24, 2020

Related U.S. Application Data

(60) Provisional application No. 62/865,430, filed on Jun. 24, 2019.

(51) Int. Cl.
| | | |
|---|---|---|
| G06F 21/30 | (2013.01) | |
| G06F 21/62 | (2013.01) | |
| G06F 16/22 | (2019.01) | |
| G06F 16/23 | (2019.01) | |

(52) U.S. Cl.
CPC ...... *G06F 21/6227* (2013.01); *G06F 16/2282* (2019.01); *G06F 16/2379* (2019.01)

(58) Field of Classification Search
CPC ........ G06F 16/13; G06F 16/24; G06F 16/156; G06F 21/30; G06F 21/31; G06F 21/62; G06F 21/6209; G06F 2221/2141; G06N 3/00; G06N 5/00; G05B 13/00
See application file for complete search history.

(56) References Cited

U.S. PATENT DOCUMENTS

| | | | | |
|---|---|---|---|---|
| 7,676,834 | B2 * | 3/2010 | Camaisa | G06F 21/31 |
| | | | | 713/185 |
| 8,719,899 | B2 * | 5/2014 | Toomey | H04L 63/0807 |
| | | | | 726/2 |
| 8,875,244 | B1 * | 10/2014 | Vaystikh | H04L 63/0815 |
| | | | | 709/225 |
| 2012/0060213 | A1 * | 3/2012 | Childress | G06F 21/31 |
| | | | | 726/18 |
| 2015/0295913 | A1 * | 10/2015 | Foote | G06F 21/31 |
| | | | | 726/6 |
| 2016/0373436 | A1 * | 12/2016 | Kapoor | G06F 21/41 |

* cited by examiner

*Primary Examiner* — Hung D Le
(74) *Attorney, Agent, or Firm* — Rankin, Hill & Clark LLP

(57) ABSTRACT

A method for resolving ambiguity in computer data includes processing a record creation request transmitted from a computing device. The record creation request includes entity creation data and a login key. The login key includes a primary identifier and a password. The method also includes executing a matching algorithm with a selectable combination of the entity creation data at an entity database to identify a single entity record matching a selectable combination of the record creation request. The single entity record is linked to multiple different login keys. The method also includes updating one or more attributes of the single entity record with the entity creation data. Further, the method includes storing session data created during a session associated with the login key by using the login key to segregate the session data in the entity database, and linking the session data to the single entity record.

17 Claims, 10 Drawing Sheets

ENTITY FORM — 126

YOUR PROFILE INFORMATION — 128

| FIRST NAME | ADDRESS 1 | CITY | ZIP CODE |
|---|---|---|---|
| JOHN | 222 STATE STREET | CLEVELAND | 44000 |

| LAST NAME | ADDRESS 2 | STATE | PRIMARY PHONE |
|---|---|---|---|
| SMITH | APT 3 | OH – OHIO | 555-555-5555 |

| LICENSE NUMBER | SSN |
|---|---|
| 8675309 | 555 55 5555 |

AUTHENTICATION WITH... — 130

| EMAIL | CONFIRM EMAIL | CREATE PASSWORD | CONFIRM PASSWORD — 132 |
|---|---|---|---|
| JOHN@SMITH.COM | JOHN@SMITH.COM | ********** | ********** |

- - - - USE SOCIAL NETWORK - - - -

[ SOCIAL NETWORK 1 ] [ SOCIAL NETWORK 2 ] [ SOCIAL NETWORK 3 ] [ SOCIAL NETWORK 4 ] — 134

[ SAVE ] — 136

FIG. 1B

SYSTEM AND METHOD FOR ASSOCIATING MULTIPLE LOGINS TO A SINGLE RECORD IN A DATABASE

RELATED APPLICATIONS

This application claims priority to U.S. Provisional Application Ser. No. 62/865,430 filed on Jun. 24, 2019, which is expressly incorporated herein by reference.

BACKGROUND

Entities interacting with computing systems often create two fundamental objects: records relating to the entity's purpose in processing information, and login/credentialing records relating to the entity's permissions and preferences with the system. Entities often forget or lose credentials, and/or create multiple login and entity records, thereby creating duplicate records and other clutter in the resulting database. The proposed invention eliminates the clutter while still maintaining privacy and security. More specifically, the methods and systems described herein address the issue of duplicate entity and login record creation while maintaining security and privacy by creating associated cache files that contain the data of each login. These cache files only display data that was provided with specific credentials. Each cache file will update the primary record and display the latest information. When the specific credentials are used to login to the computing system, access is allowed only to the data supplied with the specific credentials and not the data supplied by the same entity using different credentials another cache file. The result will be a single record in the database with no duplicates and the ability to register multiple times with different credentials.

The methods described herein meet the threshold of subject eligibility under 35 U.S.C. § 101 as a process because the utility of this new information processing method is independent of the particular meaning or use of the information processed. The immediate consumer of the newly processed information is a computerized database management system, which is incapable of hosting an abstraction. Further, the methods described herein are limited to statutory subject matter under 35 U.S.C § 101.

BRIEF DESCRIPTION

According to one aspect, a computer-implemented method for resolving ambiguity in computer data includes processing a record creation request transmitted from a computing device. The record creation request includes entity creation data and a login key. The login key includes a primary identifier and a password. The computer-implemented method also includes executing a matching algorithm with a selectable combination of the entity creation data at an entity database to identify a single entity record matching a selectable combination of the record creation request. The single entity record is linked to multiple different login keys. The computer-implemented method also includes updating one or more attributes of the single entity record with the entity creation data. Further, the computer-implemented method includes storing session data created during a session associated with the login key by using the login key to segregate the session data in the entity database, and linking the session data to the single entity record. Other embodiments of this aspect include corresponding computer systems, apparatus, and computer programs recorded on one or more computer storage devices, each configured to perform the actions of the methods.

According to another embodiment, a computer-implemented method for resolving ambiguities in computer data, includes receiving a new entity creation request, where the new entity creation request including entity creation data and a login key. The login key includes a primary identifier and a password. The computer-implemented method includes determining based on the entity data that the new entity creation request is associated with a pre-existing single entity record in an entity database, where the login key of the new entity creation request is different than a pre-existing login key linked with the pre-existing single entity record. Upon determining the new entity creation request is associated with the pre-existing single entity record, the computer-implemented method includes updating the pre-existing single entity record with the entity creation data, and creating a new data object in the entity database including data created with the login key. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 1B is a schematic view of an exemplary entity creation interface according to one embodiment;

DETAILED DESCRIPTION

As mentioned above, the methods and systems described herein address issues related to registration systems that facilitate account creation and account authorization for a system and/or a website. Many computer systems integrate registration systems to provide resources only accessible to registered and authorized entities. Typically, there are two types of entities that utilize these types of registration systems, namely, front-end users and backend users. For purposes of the examples discussed herein, the focus is the front-end user (e.g., an entity who is submitting the registration to the user registration system). However, it is understood that in other examples and embodiments, the user can be a backend user.

Figure 1A:
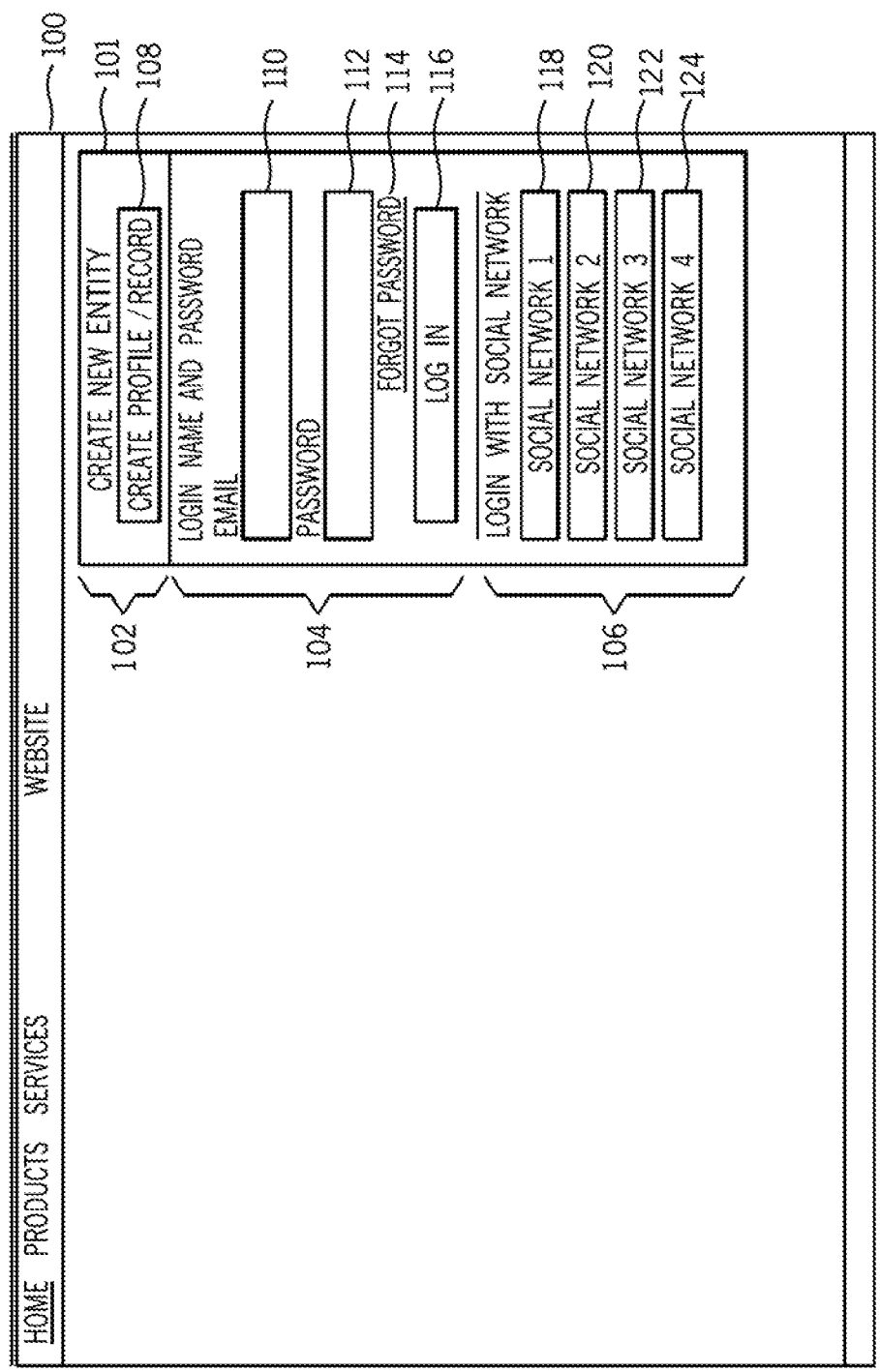
FIG. 1A is a schematic view of an exemplary homepage interface of a registration system according to one embodiment.

An illustrative example of a website and associated interfaces that integrate a registration system is shown in FIGS. 1A and 1B. In one embodiment, the website and registration system described herein is an employment marketplace for job finders, however, it is understood that the methods and systems described herein can be implemented in any field requiring entity creation. In FIG. 1A, a homepage interface 100 according to one exemplary embodiment is shown. The homepage interface 100 acts as a starting point for a website and is the default webpage that loads when an entity (e.g., an user, a web service) connects to a web address for the website.

Figure 2:
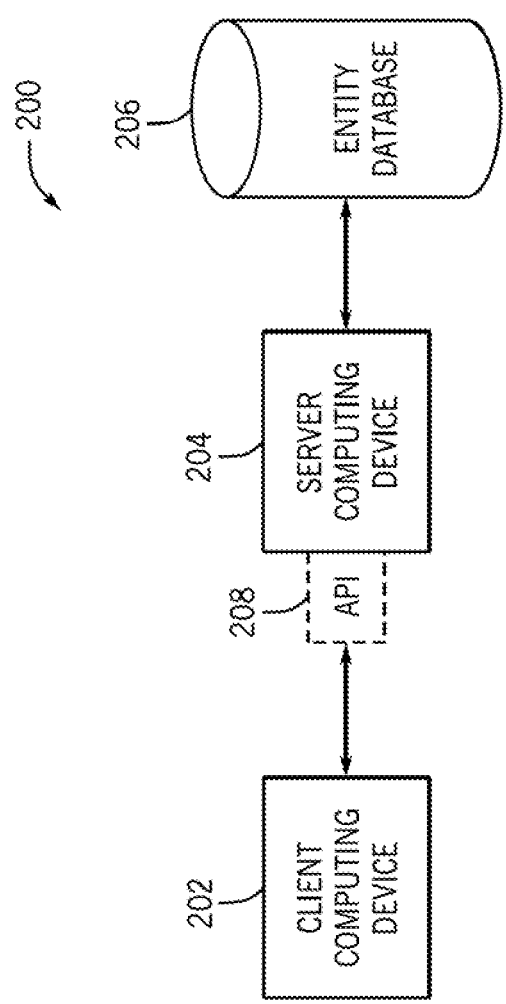
FIG. 2 is a high level block diagram of a system for associating multiple logins with a single record in a database according to an exemplary embodiment.

At the homepage interface 100, an entity can create a new account and/or login to an existing account. Specifically, the homepage interface 100 allows the entity to interact with a create new profile section 102, a login input section 104, and/or a login input section 106. The homepage interface 100 can be executed by a computing device using, for example, a browser. FIG. 2 illustrates a system 200 capable of implementing the methods discussed herein including an exemplary computing device. In particular, the system 200 includes a client computing device 202, a server computing device 204, and an entity database 206. Thus, the interfaces shown in FIGS. 1A and 1B can be executed and/or accessed by the client computing device 202 and/or the server computing device 204.

Referring again to FIG. 1A, to register a new entity on the website, the entity can provide input to a registration form. For example, to create a first time entity record, a create profile/record button 108 is selected, which generates an entity creation interface 126 shown in FIG. 1B. The entity creation interface 126 is an HTML or native form presented by the client computing device 202. In FIG. 1B, the entity creation interface 126 includes a profile input section 128 with data entry fields for receiving entity creation data, and an authentication input section 130 with data entry fields for receiving login data and/or selecting login data from a pre-existing social network.

The data entry fields in the profile input section 128 include a first name data entry field, a last name data entry field, an address data entry field, a city data entry field, a state data entry field, a zip code data entry field, a license number data entry field, and a social security number data entry field. It is understood that the profile section 128 can include any number and any type of data entry fields including those not shown. In this example, the entity creation data includes any data provided in the profile input section 128.

The authentication input section 130 allows registration of the account with name and password authentication and/or social network authentication. In FIG. 1B, a login input section 132 includes an email data entry field, an email confirm data entry field, a password data entry field, and a confirm password data entry field. This allows for account authorization with a primary identifier (e.g., email, phone number, entity name) and a password. Once the entity is created, the primary identifier and the password used to create the entity, can then be used at the homepage interface 100 to login to the account at the login input section 104 shown in FIG. 1A. In the embodiments described herein, a combination of the primary identifier and the password is referred to as a login key.

A login input section 134 allows registration of the account with information from a pre-existing social network account. Accordingly, the login input section 134 allows for selection of a first social network, a second social network, a third social network, or a fourth social network. The credentials from the selected social network are used for login and authentication of the website using, for example, the API 208 shown in FIG. 2. In this scenario, the login key is an access token provided through the selected social network and saved with the account. Upon returning to the homepage interface 100, login to the registered account is accomplished using the login input section 106 by selecting the social network used to create the entity.

Figure 3:
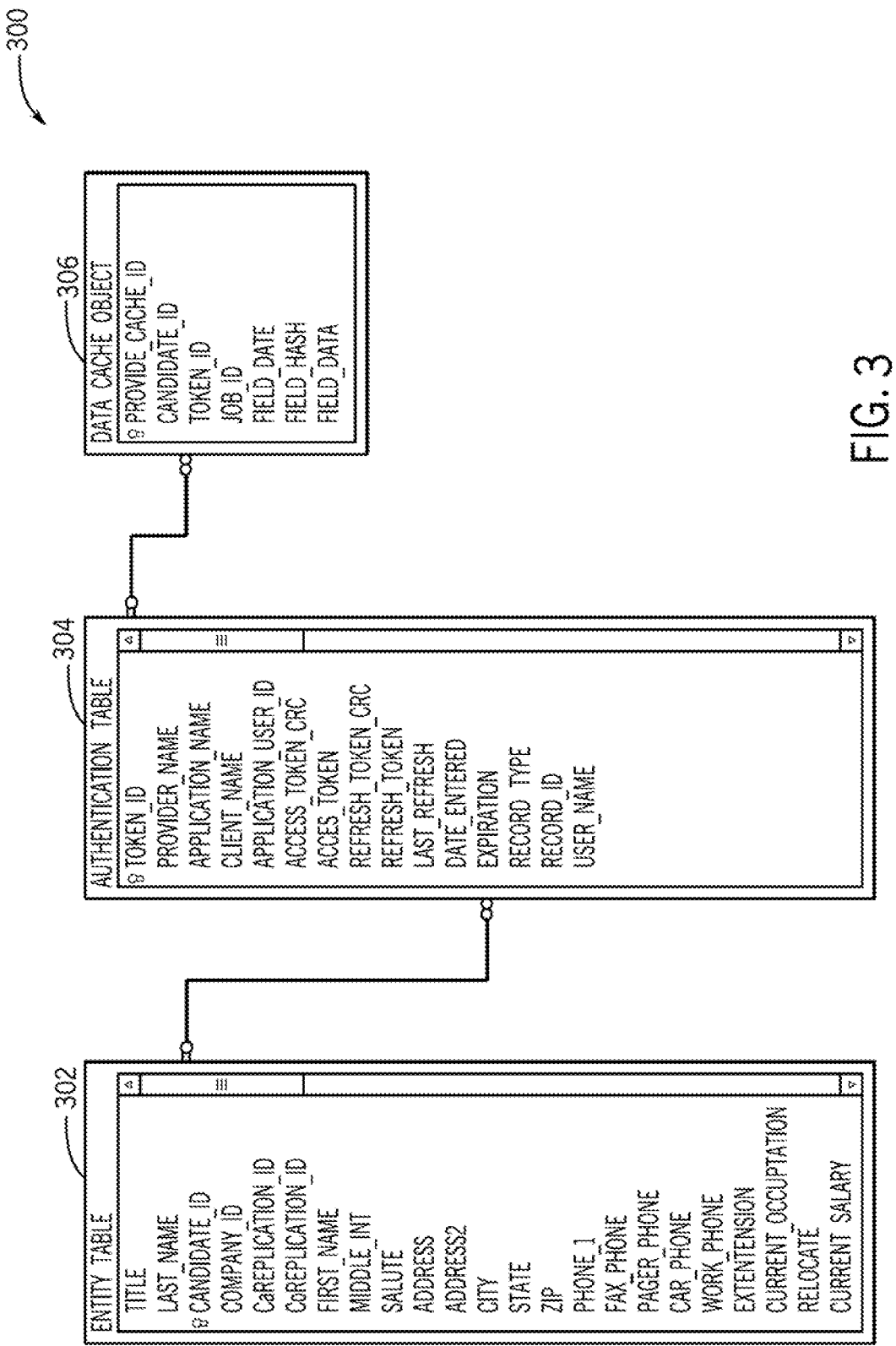
FIG. 3 is an exemplary database schema of the entity database of FIG. 2 according to one embodiment.

The entity creation interface 126 is submitted upon selection of a save button 136. The client computing device 202 generates a record creation request including the entity creation data and the login key. The client computing device transmits the record creation request to the server computing device 204 for processing and/or storage at the entity database 206. The entity database 206 will now be described in more detail with FIG. 3, which illustrates an exemplary database schema 300 of the entity database 206 according to one embodiment. In FIG. 3, the entity database 206 includes an entity table 302, an authentication table 304, and a data cache object 306 (e.g., a data cache table). The entity table 302 stores a single entity record for each registered entity. The single entity record can include one or more of the fields listed in the entity table 302, which are populated with data from the entity creation data transmitted from the entity creation interface 126. Specifically, data provided at the profile input section 128 (e.g., contact data) can be saved at the entity table 302. In some embodiments, the primary identifier can also be saved at the entity table 302. The entity table 302 can only be written to and not read by individual users.

The authentication table 304 stores login information, for example, a login key (Application_User_Id/Access_Token) that can be populated from data extracted from the login input section 132 and/or the login input section 134. Said differently, the authentication table 304 can store login keys (e.g., a primary identifier, a password, an access token) associated with an entity registered in the entity table 302. A single entity record in the entity table 302 can be associated with multiple different login keys stored in the authentication table 304. Each record in the authentication table 304 includes a key (Token_ID) that is linked to a data cache object 306. The data cache object 306 stores session data associated with each login key. For example, upon registering and/or logging into the website, data created during said login session is stored according to the login key in the data cache object 306. Thus, session data is segmented by login at the data cache object 306, and different login keys associated with the same entity can provide different data (i.e., the data created during the session associated with the login key).

To login to the homepage interface 100, a token associated with the authentication method used to login at the homepage interface 100 is retrieved from the authentication table 304, and data previously stored in the data object 306 linked to the token will be transmitted and/or displayed. Accordingly, different authentication logins can provide different data to the same entity. As mentioned above, data from the registration table 302 is never accessed and/or displayed since all logins stored at the authentication table 304 can write to the registration table 302, but can only read from the data cache object 306. This provides data security since other logins cannot inadvertently access data from the registration table 302.

Figure 5:
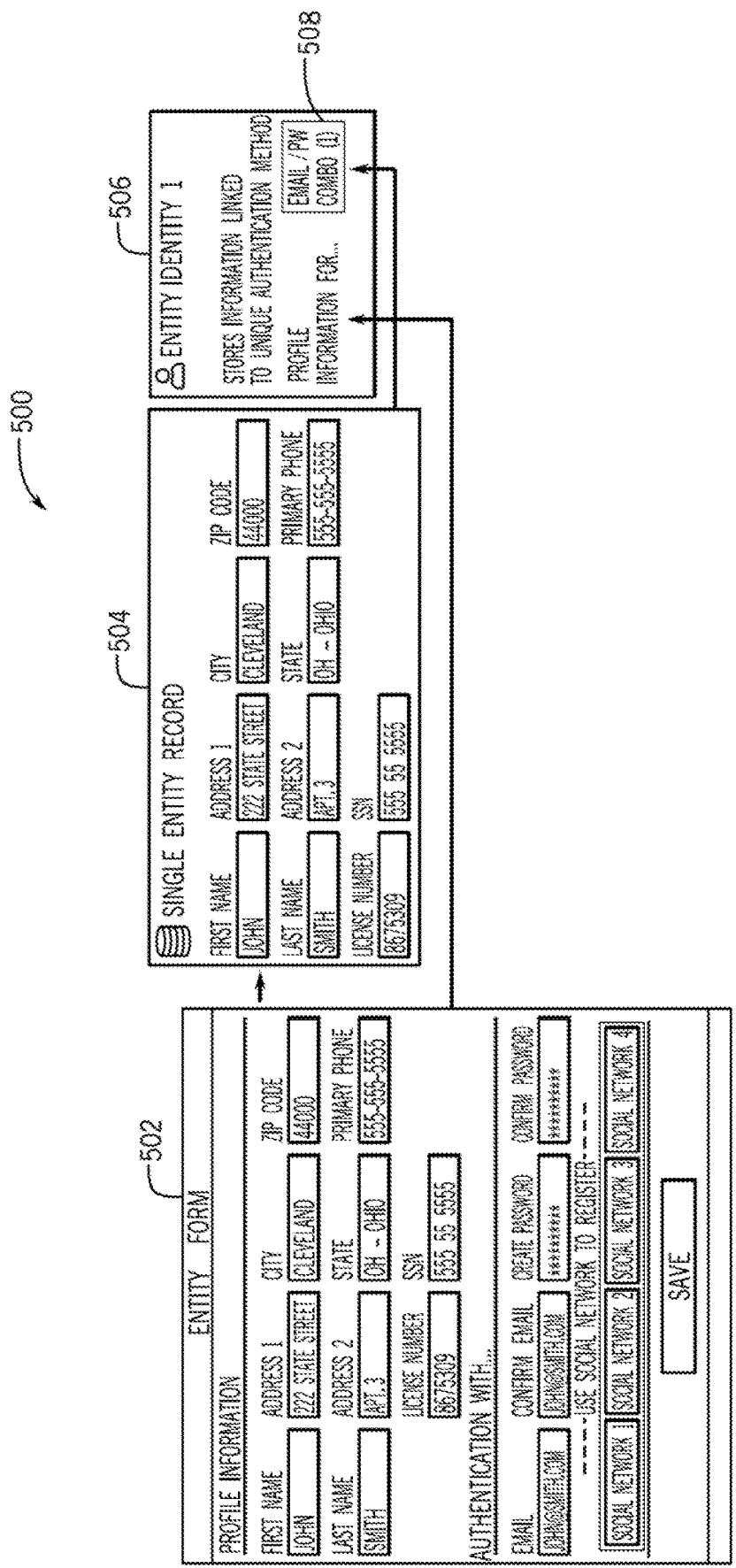
FIG. 5 is a schematic flowchart diagram illustrating a process for creating a single entity record from a registration form according to an exemplary embodiment.

Based on the database structure described above, exemplary entity creation with the entity database 206 will be described with reference to FIG. 5. FIG. 5 depicts a schematic flowchart diagram illustrating a process 500 for creating an initial new entity using name and password authentication. An entity creation interface 502 represents a simplified version of the entity creation interface 126 of FIG. 1B. In this example, the entity account is created with a login key consisting of the email and password combination shown in the entity creation interface 502. In this situation, the server computing device 204 creates a new entity account by inserting a single entity record 504 in the entity table 302 including the entity creation data, inserting a record 508 in the authentication table 304 including the login key (i.e., email and password), and inserting a data cache object 506 that stores data generated during a session associated with the login key. Accordingly, an entity identity 1 is created and linked to the single entity record 504.

Referring again to FIG. 1A, after creating an entity, access to the website and the entity account can be granted by an authorized login at the homepage interface 100. As one illustrative example, a returning entity (e.g., a user that has already registered and created an account) to the homepage interface 100 can login by interfacing with the login input section 104 or the login input section 106. The login input section 104 includes data entry fields for receiving a name and a password, namely, an email data field and a password data field. For example, referring to the example shown in FIG. 5, the entity associated with the single entity record 504 returns to the homepage interface 100 and submits the email address and the password used during entity creation to successfully login and access session data created with the email address and the password (e.g., created with the entity identity 1). Alternatively, the login input section 106 allows for login by selecting a pre-existing social network account used to create the entity identity.

There may be instances where an entity name and/or password are forgotten for an existing entity identity. In some cases, an entity may not remember ever creating an entity account. In these scenarios, it is possible the entity will select the create profile/record button 108 and submit the entity creation interface 126 again. In most registration systems, a second submission of the registration form by the same user will create another registration record in the registration system and/or database. Thus, duplicate registration records for the same entity will exist in the registration system and/or database (e.g., a duplicate record in the entity table 302).

Data duplication is a known problem in database systems and maintenance as it compromises data integrity and storage. Some registrations systems attempt to mitigate this issue by automatically merging a duplicate record with an existing record. However, this can result in revealing information the entity did not provide and thereby create a security risk by revealing sensitive information from another entity. Other registration systems can reveal that a particular username already exists and ask the user to recover the credentials. In this situation, someone can detect the existence of an entity in the database which is a security risk by an unauthorized user attempting to register using that email address or phone number.

In some registration systems, a username and/or a password recovery process is provided to address these issues. Unfortunately, when users are required to recover lost data using a recovery process, some users can become discouraged from staying on the website. This situation can be referred to as a drop off or a bounce and results in losing users and/or customers. Additionally, recovery processes can create a security loophole by assuming that a user's email account can't be hacked. The methods and systems describe herein eliminate the issues described above while maintaining a seamless entity creation process.

Figure 4:
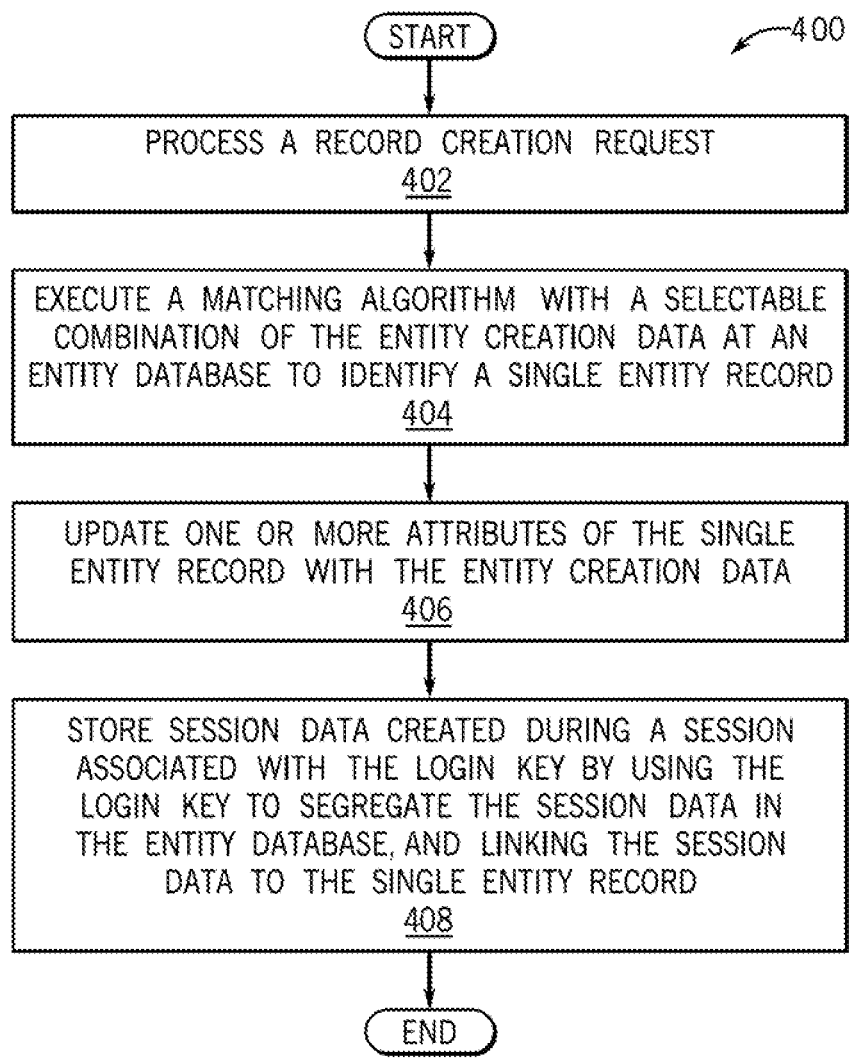
FIG. 4 is a process flow diagram for a method for associating multiple logins with a single record in a database according to an exemplary embodiment.
Figure 6:
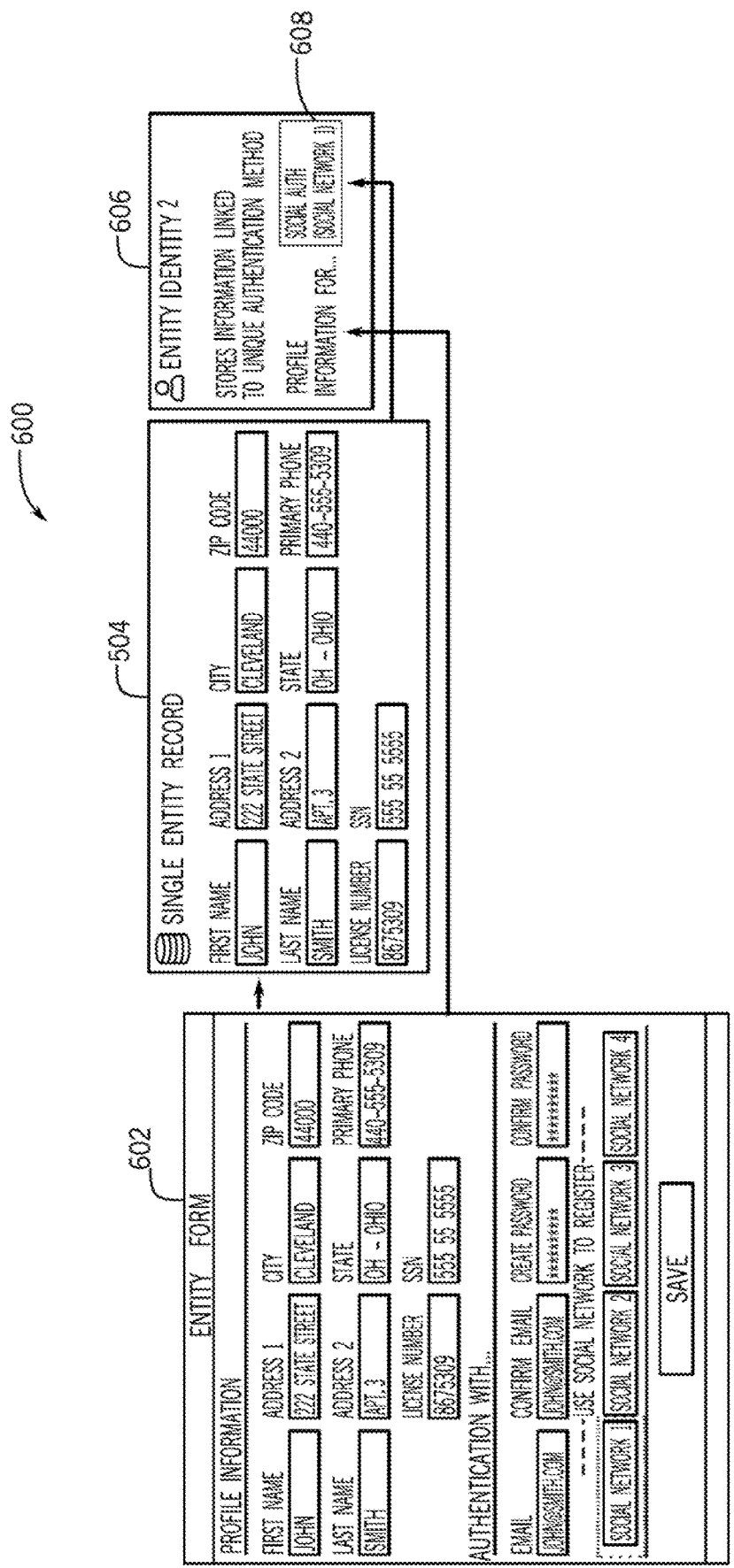
FIG. 6 is a schematic flowchart diagram illustrating a process for updating the single entity record created in FIG. 5 based on a second registration by the same entity with a different authentication method according to an exemplary embodiment.

Referring now to FIG. 4, a method 400 for associating multiple logins with a single record in a database according to one embodiment is shown. For purposes of describing FIG. 4, it is understood that an initial new entity identity (i.e., the single entity record 504) has already been created in the entity table 302. In this example, the entity identity 1 was created using a login key combination of an entity name and a password as described with FIG. 5. In one example, the entity returns to the homepage interface 100, selects the create profile/record 108, and submits the entity creation interface 126 for a second time. As shown in FIG. 6, a simplified version of the entity creation interface 126 is shown as an entity creation interface 602. Here, the authentication method chosen is social network authorization using social network 1, instead of the email and password authentication shown in FIG. 5.

Referring now to FIG. 4, the method 400 includes, at block 404, processing a record creation request transmitted from a computing device. As discussed above in detail with FIGS. 1B, 2, and 3, the computing device 202 can extract the entity creation data and a login key from the entity creation interface 602, and generate a record creation request including the entity creation data and the login key. The client computing device 202 transmits the record creation request to the server computing device 204 for processing.

As mentioned above, the record creation request includes entity creation data and a login key. In FIG. 1B, any data that is provided in the data entry fields of the entity creation interface can be considered entity creation data. Furthermore, data provided in the login section 132 or the login section 134 can be considered a login key. The login key includes a primary identifier and a password. The primary identifier can be an email address, a phone number, or an entity name, for example. The password can be a string of characters used for authenticating an entity on the server computing device 204. In the illustrative example of FIG. 6, the login key includes a link and/or a token provided by social network authentication via social network 1.

Referring again to the method 400, at block 404 the method 400 includes executing a matching algorithm with a selectable combination of the entity creation data at the entity database 206. The matching algorithm is executed to identify a single entity record in the entity table 302 matching the selectable combination of the record creation request. In other words, it is determined whether a pre-existing single entity record in the entity database 206 matches a selectable combination of the entity interface data in the new entity creation request.

Accordingly, at block 404, the server computing device 204 can execute a query at the entity table 302 for a single entity record based on an email address, an entity name, and/or a device identifier. In this example, the selectable combination of the entity creation data includes one or more of the email address, the entity name, and the device identifier. However, the selectable combination of the entity creation data can include any combination of data input into the entity creation interface.

If the results of the query executed at the entity table 302 results in no records found, a pre-existing entity identity does not exists, and a new single entity record is created as described above with FIG. 5. More specifically, a new single entity record is created in the entity table 302, a new authentication record is created in the authentication table 304 and linked to the new single entity record, and a new data cache object 306 is created and linked to the new single entity record. As will be discussed herein, the single entity record can be linked to multiple different login keys in the authentication table 304.

If a single entity record is identified at step 404, then one or more of the fields of the single entity record in the entity database 206 are overwritten and/or created. In the illustrative examples of FIGS. 5 and 6, the single entity record 504 is identified based on a selectable combination of the entity creation data submitted the second time at the entity creation interface 602. Accordingly, the method 400 at block 406, includes updating one or more attributes of the single entity record 504 with the entity creation data from the entity creation interface 602. This ensures that the single entity record is maintained and updated for the same entity even if the same entity has multiple login identities.

At block 408, the method 400 includes storing session data created during a session associated with the login key by using the login key to segregate the session data in the entity database. As described above with FIGS. 3 and 5, a data cache object 306 stores session data created during a session associated with a particular login key. Any data that is submitted by another login key associated with the same entity will maintain its own data cache object 306. Said differently, each login key stored in the authentication table 304 will maintain a link to cached session data stored in the data cache object 306. Accordingly, to login to the homepage interface 100, access is provided to session data stored with a specific login key.

In the illustrative examples of FIGS. 5 and 6, the login keys used for registration are different, but the entity is the same and one single entity record 504 exists for the entity. Upon determining the login key from the entity creation interface 602 is different from any login key in the authentication table 304 linked to the single entity record 504, the server computing device 204 inserts a new login to the authentication table 304 with the token associated with authentication using social network 1. The server computing device 204 also inserts a new data cache object 306 associated with the login session, and any session data created during the login session associated with social network 1, is stored separately (i.e., in the new data cache object 306) from session data created during the login session associated with the login key of FIG. 5. The session data in the data cache object 306 is linked to the single entity record 504.

This process allows entities to register multiple times with the same email address or phone number with a different password and only one record will be created and/or maintained. When an entity returns to access and/or login to an account they will only see a copy of the data they supplied with a particular login combination. One session will not be able to see the data from other sessions. Accordingly, the method 400 at block 408 can also include transmitting to the computing device 202 the session data created during a session associated with the login key in the data cache object. The computing device 202 can display the session data. For example, with respect to the illustrative example of FIG. 6, if pre-existing data in the data cache object 306 is linked with the social network 1 session, access to the pre-existing data is granted and can be transmitted to the client computing device 202.

Figure 7:
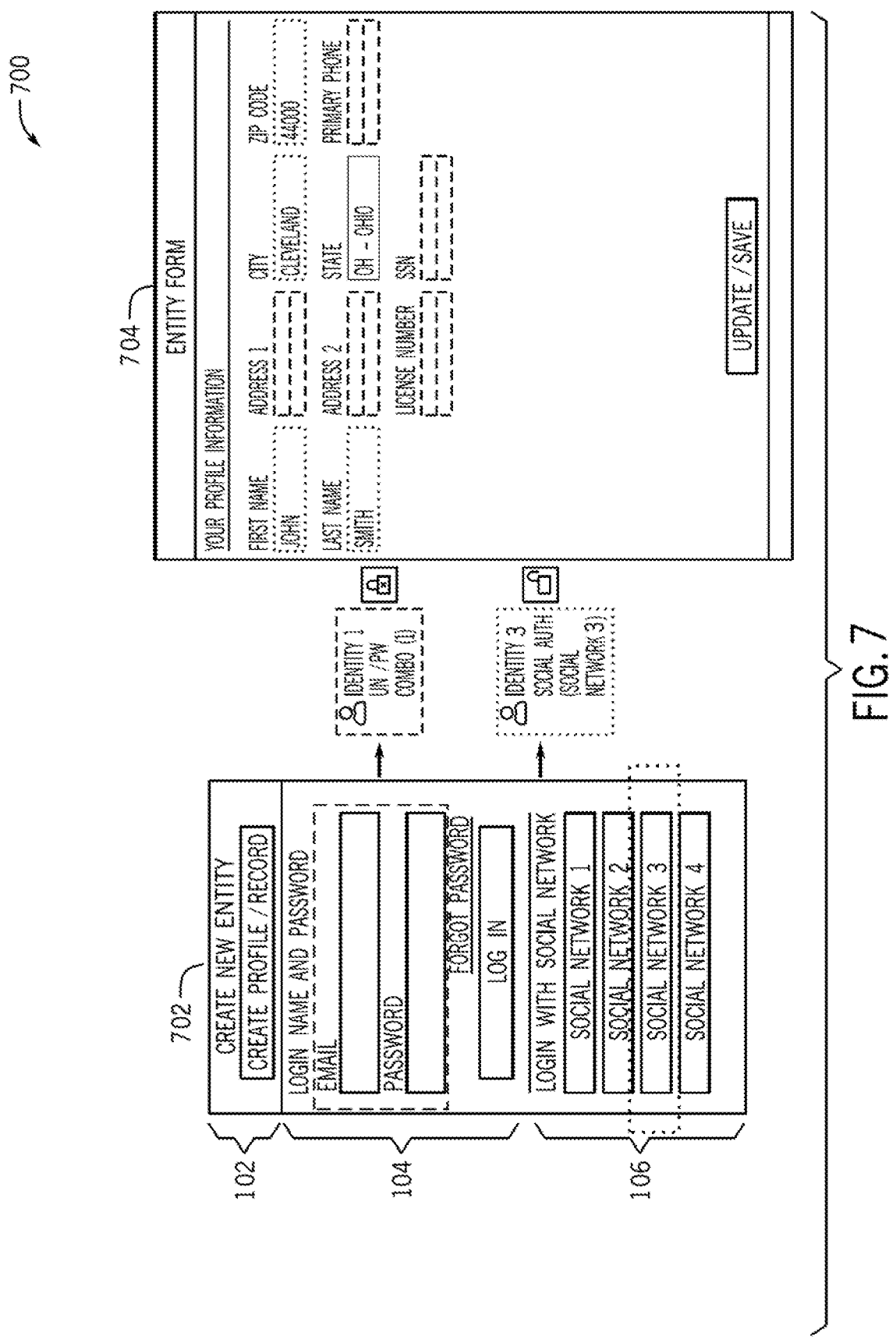
FIG. 7 is a schematic flowchart diagram illustrating a process for updating the single entity record created in FIG. 5 from a login interface of the homepage according to an exemplary embodiment.

As another illustrative example, FIG. 7 illustrates a diagram 700 for verifying a further entity identity and accessing data associated with the further entity identity. In this embodiment, it is understood that the server computing device 204 has already processed a further entity creation request (e.g., a third entity registration) associated with the single entity record 504. The further entity creation request having further entity creation data and a further login key. The further login key having a further primary identifier and a further password. In this scenario, the further login key is different than the login key associated with the entity identity 1 and/or the entity identity 2.

Figure 8:
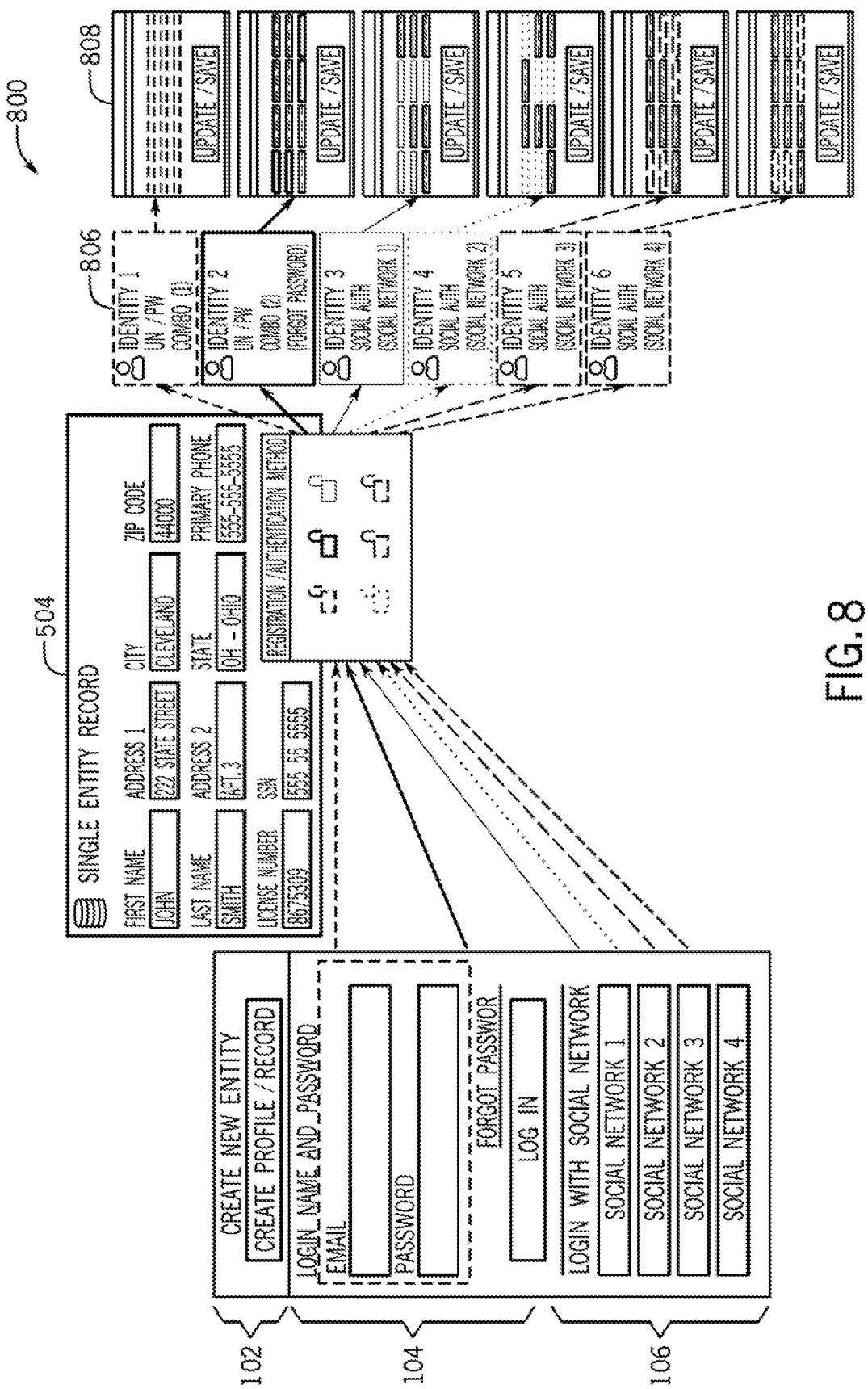
FIG. 8 is a schematic flowchart diagram illustrating an overall process of a return entity logging in using methods described herein according to an exemplary embodiment.

In FIG. 7, an interface section 702 is shown, which is a simplified version of the interface section 101 of FIG. 1A. In this scenario, the entity returns to the homepage interface 100 and selects select social network 3 in the interface section 702. The server computing device 204, using the API 208, authenticates the entity via social network 3. Upon authentication, the server computing device 204 executes a query on the data cache object 306 for session data associated with the single entity record 504 and the social network 3 token. As shown in FIG. 7, access is provided only to session data created with the social network 3 token. This session data is shown populated in the form 704. Data associated with the email address and password combination of entity identity 1 is denied during this session. Again, this illustrates the security of the methods and systems described herein since data from other login sessions cannot be accidentally exposed. FIG. 8 includes a diagram 800 showing that logging in with different methods will create different entity identities that attach to the single master record 504. The entity identity then determines what information will be available for transmission and/or display providing enhanced security.

Resetting a password for the multiple login system and method described above can be complex and require multiple steps. Referring again to FIG. 1A, if the forgot password link 114 is selected, a password reset request is transmitted from the the client computing device 202 to the server computing device 204. In some embodiments, the password reset request includes a reset login key comprising a reset primary identifier and a reset password. The reset login key and/or the reset primary identifier can be provided by the client computing device 202, for example, based on input from the homepage interface 100 at the input interface 104. The server computing device 204 inserts the reset login key in the authentication table 304 and retrieves from the data cache object a most recent data cache record associated with the single entity record. The most recent data cache record 306 is updated with the reset login key and the remaining records in the data cache object 306 associated with the single entity record are deleted. The remaining records associated with the single entity record in the authentication table 304 are linked to the recent data cache record 306. This process eliminates the security loophole of accidentally revealing sensitive information (e.g., email address) during the password recovery process.

Figure 9:
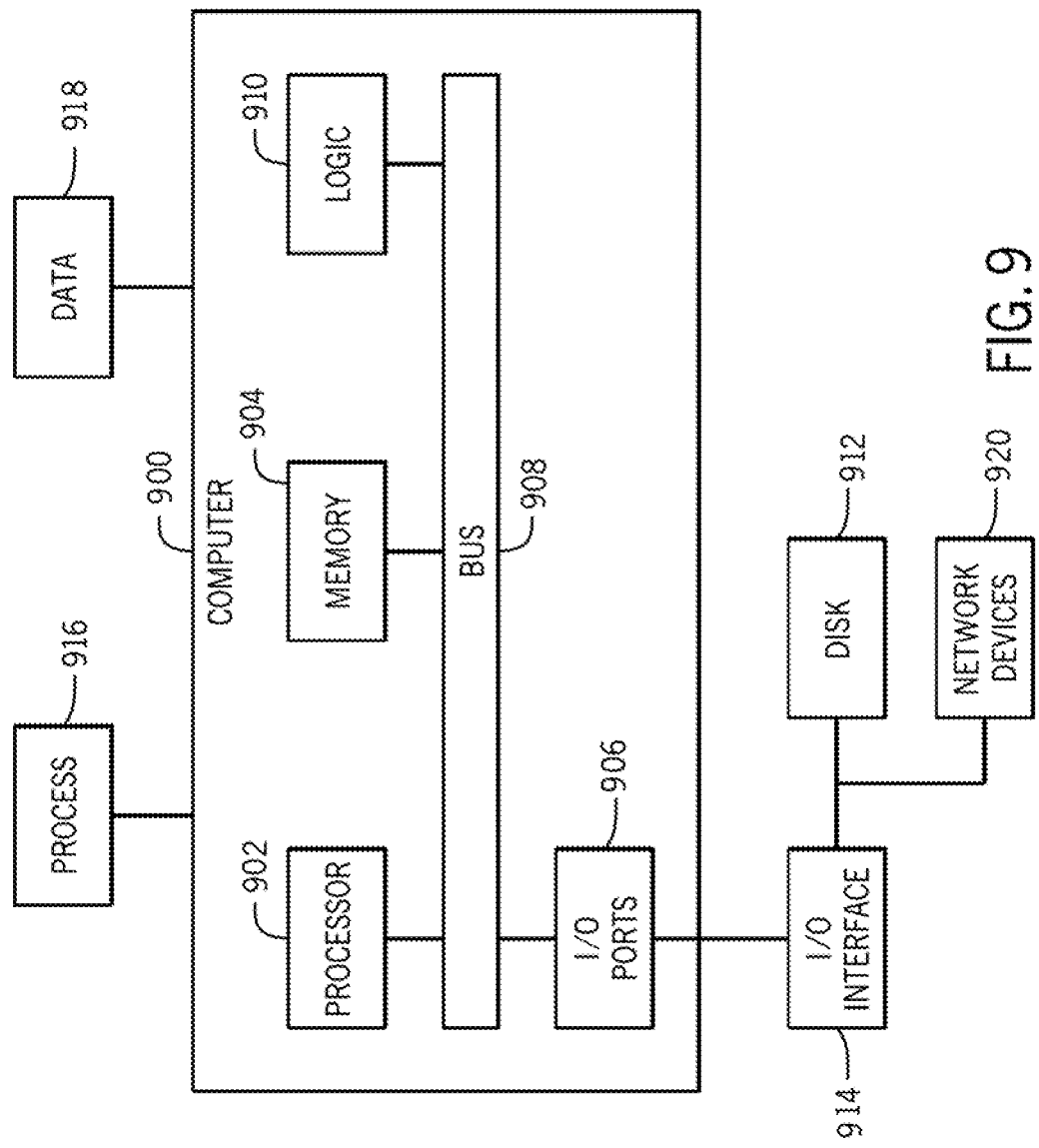
FIG. 9 is a high level block diagram of an exemplary computing devices configured to facilitate the exemplary systems and methods discussed herein.

FIG. 9 illustrates an example computing device in which example systems and methods described herein, and equivalents, can operate. For example, the components of the system 200 including the client computing device 202, the server computing device 204, and the entity database 206, can include one or more of the same or similar components and functions shown in FIG. 9. The example computing device may be a computer 900 that includes a processor 902, a memory 904, and input/output ports 906 operably connected by a bus 908. In one example, the computer 900 may include a logic 910. Logic 910 may provide means (e.g., hardware, software, firmware) for associating multiple logins to a single record in a database according to the systems and methods discussed herein. The means may include a logic, a data store, and so on.

A disk 912 may be operably connected to the computer 900 via, for example, an input/output interface (e.g., card, device) 914 and an input/output port 906. The memory 904 can store processes 916 and/or data 918, for example. The disk 912 and/or memory 904 can store an operating system that controls and allocates resources of the computer 900.

The computer 900 may interact with input/output devices via i/o interfaces 914 and input/output ports 906. Input/output devices can include, but are not limited to, a keyboard, a microphone, a pointing and selection device, cameras, video cards, displays, disk 912, network devices 920, and so on. The input/output ports 906 can include but are not limited to, serial ports, parallel ports, and USB ports.

The computer 900 can operate in a network environment and thus may be connected to network devices 920 via the i/o interfaces 912, and/or the i/o ports 906. Through the network devices 920, the computer 900 may interact with a network. Through the network, the computer 900 may be logically connected to remote computers. The networks with which the computer 1000 may interact include, but are not limited to, a local area network (LAN), a wide area network (WAN), and other networks. The network devices 920 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 920 connect to WAN technologies including, but not limited to, point to point links, circuit switching networks (e.g., integrated services digital networks (ISDN)), packet switching networks, cellular networks, and digital subscriber lines (DSL).

Definitions

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into different architectures.

The embodiments discussed herein can be described and implemented in the context of "computer-readable medium" or "computer storage medium." As used herein, "computer-readable medium" or "computer storage medium refers to a non-transitory medium that stores instructions, algorithms, and/or data configured to perform one or more of the disclosed functions when executed. Computer-readable medium can be non-volatile, volatile, removable, and non-removable, media implemented in any method or technology for storage of information such as computer readable instructions, data structures, modules or other data. Computer-readable medium can include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can interface with. Computer-readable medium excludes non-transitory tangible media and propagated data signals.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display" or "display device," as used herein, herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry" or "logic," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for resolving ambiguity in computer data, comprising:
    processing a record creation request transmitted from a computing device, the record creation request including entity creation data and a login key, wherein the login key includes a primary identifier and a password;
    executing a matching algorithm with a selectable combination of the entity creation data at an entity database to identify a single entity record matching a selectable combination of the record creation request, wherein the entity database includes an entity record table or index, an authentication table or index, and a data cache object, wherein the single entity record is linked to multiple different login keys;
    updating one or more attributes of the single entity record with the entity creation data;
    storing session data created during a session associated with the login key by using the login key to segregate the session data in the entity database, and linking the session data to the single entity record;
    processing a further entity creation request associated with the single entity record, the further entity creation request including further entity creation data and a further login key comprising a further primary identifier and a further password, wherein the further login key is different than the login key; and
    granting read-only access to session data associated with the further login key in the data cache object.

2. The computer-implemented method of claim 1, wherein the entity creation data is extracted from an entity creation interface and transmitted from the computing device via the record creation request, the entity creation interface having one or more data entry methods configured to receive the entity creation data and the login key.

3. The computer-implemented method of claim 1, wherein the entity creation data includes an email address, an entity name, and a device identifier, and the selectable combination of the entity creation data includes one or more of the email address, the entity name, and the device identifier.

4. The computer-implemented method of claim 1, including transmitting to the computing device the session data created during a session associated with the login key in the data cache object.

5. The computer-implemented method of claim 1, including determining if pre-existing data linked with the session and the login key is stored in the data cache object, and transmitting the pre-existing data to the computing device.

6. The computer-implemented method of claim 1, including updating the single entity record according to the further entity creation data thereby maintaining a single entity records for a plurality of entity creation requests with different login keys.

7. The computer-implemented method of claim 1, including receiving a password reset request, the password reset request including a reset login key comprising a reset primary identifier and a reset password.

8. The computer-implemented method of claim 7, including inserting the reset login key in the authentication table.

9. The computer-implemented method of claim 8, including retrieving from the data cache object a most recent data cache record associated with the single entity record, and updating the most recent data cache record with the reset login key, and deleting remaining records in the data cache object associated with the single entity record, and linking remaining records in the authentication table associated with the single entity record with the most recent data cache record.

10. A computer-implemented method for resolving ambiguity in computer data, comprising:
   processing a record creation request transmitted from a computing device, the record creation request including entity creation data and a login key, wherein the login key includes a primary identifier and a password;
   executing a matching algorithm with a selectable combination of the entity creation data at an entity database to identify a single entity record matching a selectable combination of the record creation request, wherein the entity database includes an entity record table or index, an authentication table or index, and a data cache object, wherein the single entity record is linked to multiple different login keys;
   updating one or more attributes of the single entity record with the entity creation data;
   storing session data created during a session associated with the login key by using the login key to segregate the session data in the entity database, and linking the session data to the single entity record;
   receiving a password reset request, the password reset request including a reset login key comprising a reset primary identifier and a reset password;
   inserting the reset login key in the authentication table; and
   retrieving from the data cache object a most recent data cache record associated with the single entity record, and updating the most recent data cache record with the reset login key, and deleting remaining records in the data cache object associated with the single entity record, and linking remaining records in the authentication table associated with the single entity record with the most recent data cache record.

11. The computer-implemented method of claim 10, wherein the entity creation data is extracted from an entity creation interface and transmitted from the computing device via the record creation request, the entity creation interface having one or more data entry methods configured to receive the entity creation data and the login key.

12. The computer-implemented method of claim 10, wherein the entity creation data includes an email address, an entity name, and a device identifier, and the selectable combination of the entity creation data includes one or more of the email address, the entity name, and the device identifier.

13. The computer-implemented method of claim 10, including transmitting to the computing device the session data created during a session associated with the login key in the data cache object.

14. The computer-implemented method of claim 10, including determining if pre-existing data linked with the session and the login key is stored in the data cache object, and transmitting the pre-existing data to the computing device.

15. The computer-implemented method of claim 10, processing a further entity creation request associated with the single entity record, the further entity creation request including further entity creation data and a further login key comprising a further primary identifier and a further password, wherein the further login key is different than the login key.

16. The computer-implemented method of claim 15, including updating the single entity record according to the further entity creation data thereby maintaining a single entity records for a plurality of entity creation requests with different login keys.

17. The computer-implemented method of claim 15, including granting read-only access to session data associated with the further login key in the data cache object.

* * * * *